Inventor:
John R. Stephens.
By Elliott & Ammen
Att'ys.

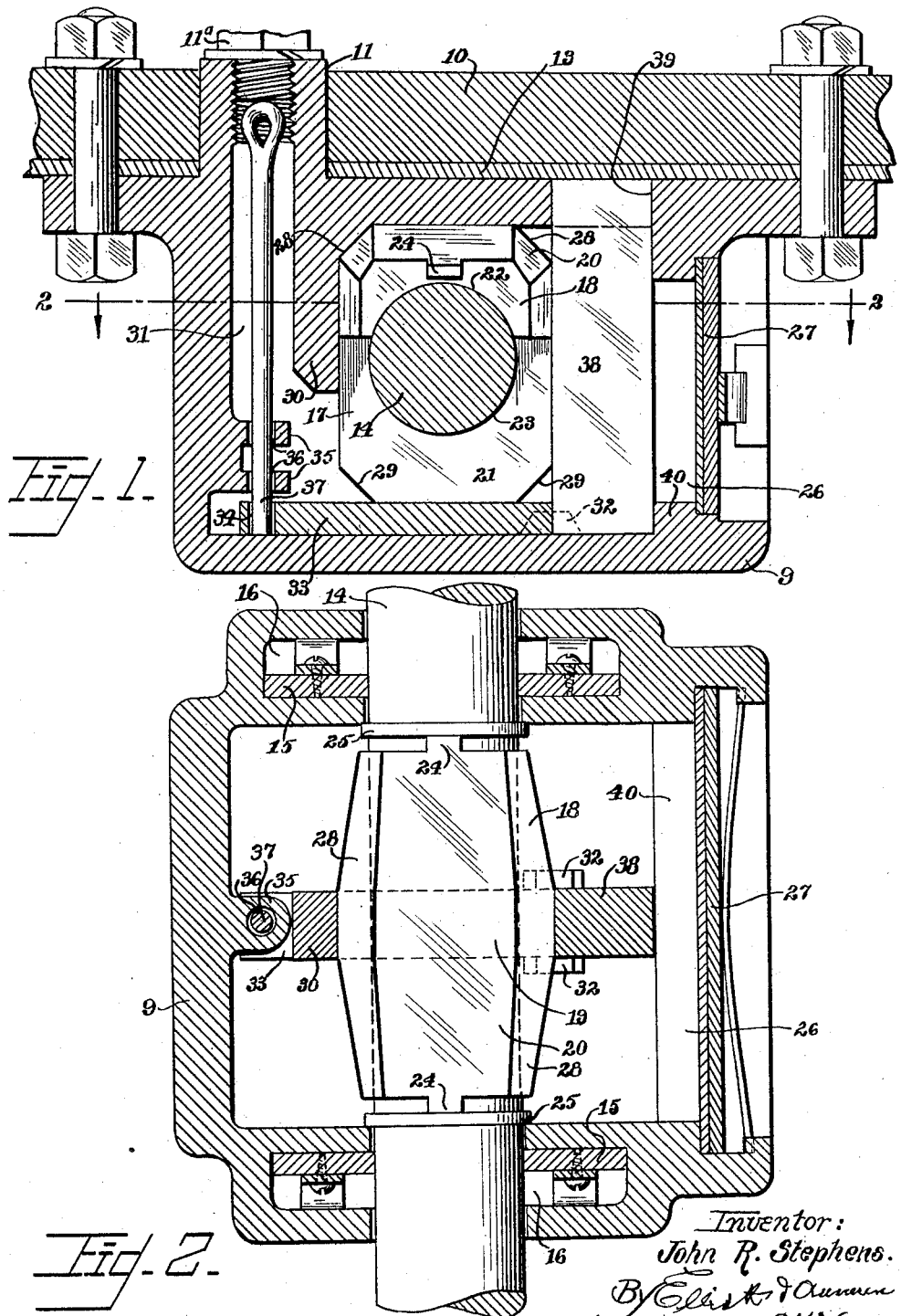

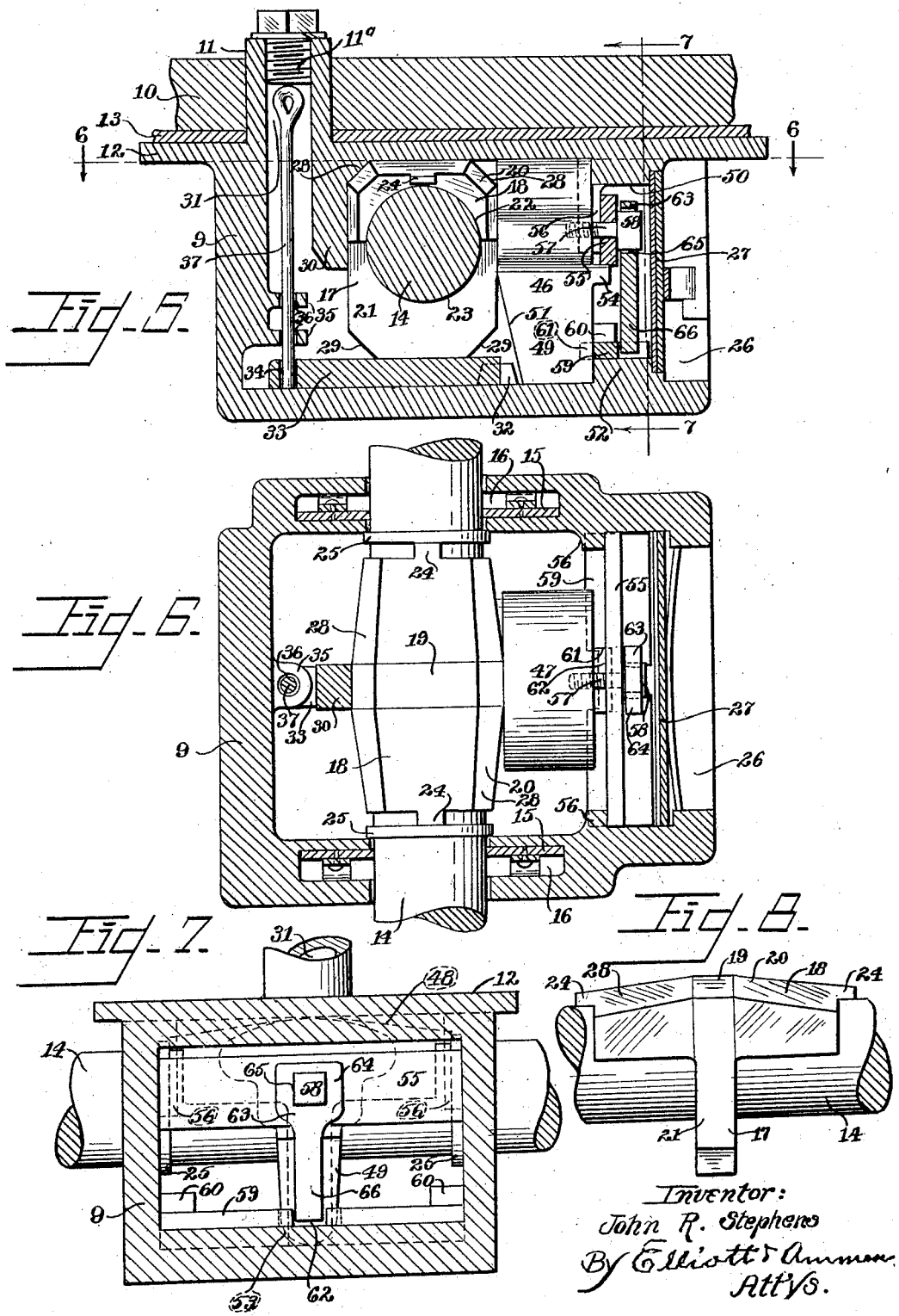

UNITED STATES PATENT OFFICE.

JOHN R. STEPHENS, OF ST. LOUIS, MISSOURI.

CAR-AXLE BEARING.

1,401,203.   Specification of Letters Patent.   Patented Dec. 27, 1921.

Application filed September 2, 1920. Serial No. 407,652.

*To all whom it may concern:*

Be it known that I, JOHN R. STEPHENS, a citizen of the United States, residing in the city of St. Louis and State of Missouri, have invented new and useful Improvements in Car-Axle Bearings, of which the following is a specification.

This invention relates to car axle bearings intended more particularly for use with mine cars, although not limited to such application. The invention has for its general object to provide a novel construction of combined bearing block and support for a car axle and to provide novel means for locking the same in position in the journal box or housing.

The general object of my invention as it relates to securing the bearing block and support in position may be attained in various ways, and in the drawings accompanying this application I have shown three different ways of accomplishing this object. According to one of these a plate is inserted through the top of the box and engages one side of the bearing block and support, the plate itself engaging at its opposite side against the wall of the casing. In another form the combined bearing block and support is bodily inserted through an opening in the top of the journal box and is held in position by engagement with fixed parts on the interior of the journal box.

According to a third form of the invention, the bearing block and support is inserted through the end of the journal box and a novel construction of locking plate, also insertible through the end of the journal box, is provided for engaging the bearing block and support to hold it in position, and novel means are also provided for holding the locking plate in position.

My invention therefore has for further objects the provision of certain novel constructions and arrangements of parts whereby the general object above indicated is attained.

In the accompanying drawing,

Figure 1 is a cross sectional view through a car axle bearing and box showing the bearing block and support held in position in the box by a locking plate inserted through an opening in the top of the box;

Fig. 2 is a horizontal sectional view on the line 2—2 of Fig. 1, the axle and bearing block being shown in plan;

Fig. 5 is a view similar to Fig. 1, but on a reduced scale showing the construction in which the bearing block and the locking plate therefor are inserted through the opening in the end of the box;

Fig. 6 is a view in horizontal section through the box in Fig. 5 taken on the line 6—6 of said figure, the bearing block, axle, locking plate and allied parts being shown in plan;

Fig. 7 is a sectional view taken on the line 7—7 of Fig. 5 and viewed in the direction of the arrows; and Fig. 8 is a view in side elevation showing the bearing block of Figs. 1, 2, 5 and 6 in position on the axle.

Figure 3:
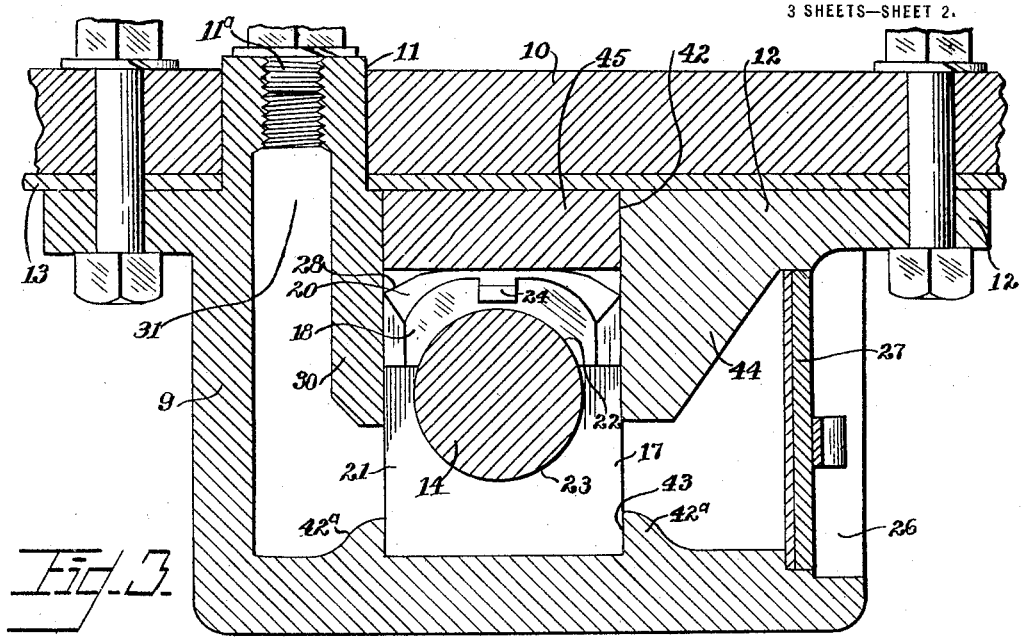
Fig. 3 is a view similar to Fig. 1 but showing the construction in which the bearing block is bodily inserted through an opening in the top of the box.

Referring now particularly to Figs. 1 and 2, the numeral 9 indicates a journal box adapted to be secured in the ordinary manner on the under side of a sill 10 of the car and having an interiorly screw-threaded projection 11 extending upward through the sill through which oil may be supplied to the interior of the journal box. The screw-threads in this projection are for receiving the correspondingly threaded shank of a headed bolt, 11ᵃ for closing the opening in the projection. Between the sill 10 and the upper side of the top 12 of the journal box is inserted a stout iron plate 13. The journal box is apertured at opposite ends as shown in Fig. 2 to receive the axle 14, suitable dust guards 15 being mounted as usual in housings 16 at opposite sides of the journal box. The numeral 17 indicates my improved combined bearing block and support for the axle, which is also shown in side elevation in Fig. 8. This member comprises a longitudinally extending portion 18 having a central flat portion 19 providing a bearing on its upper side and inclined downward therefrom to the ends as indicated at 20. The central portion of the bearing block for about the width of the bearing has an integral downwardly extending portion 21, and the bearing block 18 extends an equal distance on either side of the portion 21 and these projecting portions are provided on their under side with a semi-circular recess 22 which receives the upper half of the axle 14 within the journal box. At the central portion 19 of the bearing block the recess 22 merges into a central circular opening 23 extending through the bearing block and the extension 21 through which the axle 14 extends. At either end of the bearing block are provided central projecting abutments 24 which, when the bearing block is in position on the axle, engage the inner faces of annular washers 25 inserted on the axle which serve to hold the bearing block from longitudinal movement on the axle. The outer sides of the washers 25 bear against the inner walls of the journal box surrounding the axle and the purpose of the abutments 24 is to permit of movements of the bearing block 17, such as occur in the operation of the cars and at the same time, prevent the ends of the bearing block from engaging the side walls of the journal box. It should be explained that if the ends of the bearing block are permitted to engage the walls of the journal box they would tend to jamb the bearing block in the box. The journal box 9 is provided at its inner end with an opening 26, which is adapted to be closed by a dust proof door 27 in the usual, or any preferred way, and through this opening the bearing block and support is adapted to be inserted to have the position in the journal box shown in Fig. 1, after which the journal box is passed over the end of the axle which also passes through the bearing block and support. Owing to the restricted area of the interior of the journal box, in order to enable the bearing block and support to be turned into position, corners thereof along either side are beveled off as indicated at 28, and the corners of the portion 21, at the bottom, are correspondingly beveled as indicated at 29. At its forward end the wall of the journal box is thickened centrally to provide a rib 30, which projects downwardly at one side of the oil hole 31 to a point slightly below the longitudinal center of the axle 14. The rib 30 on its inner side provides a wall against which the forward side of the support 21 and the central portion of the bearing block rest, as shown in Fig. 1, and where the wall merges with the top 12 of the journal box the chamber provided is shaped to conform to the configuration of the beveled portion 28 of the bearing block at the center thereof. It is desirable to provide against vertical, as well as lateral movement of the combined bearing block and support and to this end that the bottom of the support 21 should rest upon a fixed member on the interior of the journal box. In the form of the invention shown the bottom of the support 21 cannot rest upon the bottom of the journal box as it will then be impossible to turn the combined bearing block and support into position. It is necessary, therefore, after the combined bearing block and support has been placed in position to insert a shim under its bottom edge. With this in view the bottom of the journal box is provided on its inner side with a pair of upstanding lugs 32 spaced a suitable distance apart. After the bearing block and support is in position a shim 33, which is in the form of a bar of metal of about the width of the support 21 is inserted endwise through the opening 26 into position under the bottom edge of the support 21, its rear end resting midway between the lugs 32, as shown in Fig. 1, which end is thus prevented from lateral movement. The opposite end of the shim is provided with a vertically disposed aperture 34. The forward wall of the journal box is provided with two inwardly extending parallel projections 35 which are provided with alining apertures 36 and when the shim 33 is in position its opening 34 will be in alinement with the opening 36. The numeral 37 indicates a pin which is inserted through the oil hole 31, its lower end portion passing through the apertures 36 and the aperture 34 in the shim 33 and its lower end resting upon the bottom of the journal box 9. When so positioned the pin 37 operates to hold the forward end of the shim 33 against lateral and longitudinal movement. The bottom of bolt 11ª engages the top of pin 37 and prevents it from disengaging from the shim 33 vertically. In order to lock the bearing block and support at its inner side against movement I provide the construction now to be described.

The numeral 38 indicates a locking plate which, as shown in Fig. 2, is rectangular in shape and is adapted to be inserted endwise through a correspondingly shaped aperture 39 provided in the top 12 of the journal box. When so inserted the locking plate 38 is adapted to have its forward edge engage more or less snugly the inner side of the bearing block and support 17 while the inner edge of said locking plate rests against the corresponding edge of the opening 39 at the top and against the inner side of a projection 40, forming a sill of the opening 26. The forward edge portion of the locking plate 38 is adapted to be received between the rear portions of the lugs 32, as shown in both Figs. 1 and 2, and said locking plate is thus held against lateral and longitudinal movement. After the locking plate is inserted in the journal box its upper end will lie flush with the upper side of the top 12 of the journal box. The iron plate 13, of course, engages the top of the locking plate when the journal box is bolted in position on the car.

By the construction described, I am enabled to provide in one member a bearing block to rest upon the top of the axle 14 and a stirrup or support 21, the purpose of which is to support the axle against excessive downward movement and to maintain the combined bearing block and support in a relatively fixed position in the bearing box in a very simple and efficient manner. At the same time, the tapered character of the bearing block and the provision of the abutments 24 provide for the various movements of the bearing block which occur in operation, by pivotal movements at the ends and rolling movements at the top and side, thus eliminating undue friction and binding.

It will be understood, of course, that the usual waste is inserted through the opening 26 and oil supplied thereto through the oil hole 31 before the car with the journal box thereon is placed in operation.

The main idea of my invention is shown by the construction illustrated in Figs. 1 and 2 and above described and comprises, as pointed out, the unitary bearing block and support with means for locking the same in position in the journal box. Inasmuch, however, as the bearing block and support may be locked in position by other ways known to me than that shown in Figs. 1 and 2, and also to illustrate that the invention is not confined to the particular construction shown in these figures, I have considered it desirable to illustrate two other constructions in both of which a unitary bearing block and support is employed but different means for locking the same in position are shown. These constructions will now be described.

Figure 4:
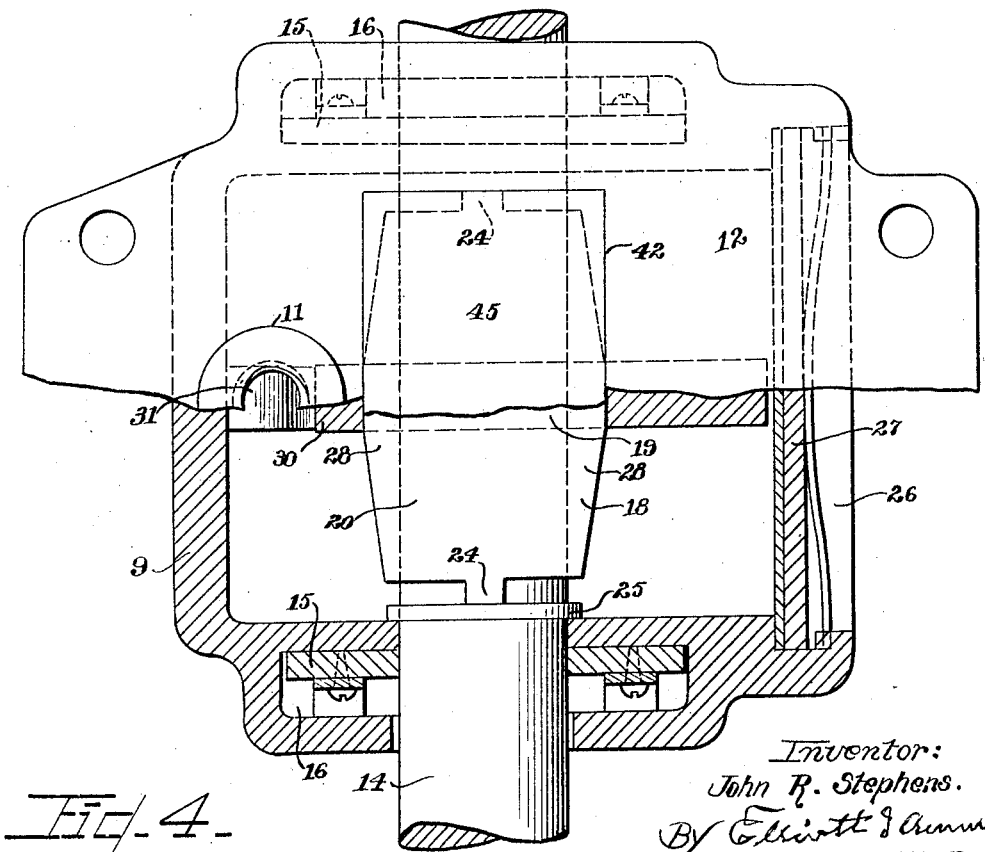
Fig. 4 is a view partly in plan and partly in horizontal section of the construction shown in Fig. 3.

Referring to Figs. 3 and 4 I show a construction in which the combined bearing block and support is held in position substantially entirely by members formed integral with the journal box. To this end the top 12 of the journal box is provided with a rectangular opening 42 through which the bearing block and support 17 may be inserted. The bottom of the journal box, on its inner side, is centrally thickened longitudinally as indicated at 42ª and in said thickened portion is provided with a rectangular recess 43 which receives the lower edge portion of the support 21. The central rib 30 as before engages the forward side of the bearing block and support and the inner side of said rib in this case forms a continuation of the side of the forward end of the opening 42. At the inner end of the opening 42 the top 12 of the journal box is provided on its under side with a central depending rib 44 which extends downwardly, preferably to a short distance below the center of the axle 14, and the front edge of which forms a continuation of the rear wall of the opening 42 and is adapted to be engaged by the rear side of the bearing block and support 17. After being placed in position a metal plate or block 45 of the same size and shape as the opening 42 is inserted in said opening to rest upon the top of the bearing block and is in turn covered by the stout iron plate 13, previously referred to. When the securing bolts 41 are applied, the top of the journal box will be drawn firmly against the under side of the plate, and the latter will be drawn against the under side of the sill, so that these parts become, in effect a unitary structure. The plate 13 bearing on the block 45, holds the same in engagement with the top of the bearing block, and prevents vertical movement of the latter.

In both of the constructions thus far described it is necessary to remove the journal box from the car in order to be able to remove the bearing block and support from the journal box, to repair the same or to replace this member with a new one.

The final construction to be described provides for the insertion of the journal box and its locking member through the end of the box and removal of the same in like manner when desired.

Referring now to Figs. 5 to 7, the combined bearing block and support 17 is adapted to be inserted through the opening 26 and when in position its bottom edge rests upon the shim 33 which is locked in position by the same means and in the same manner as illustrated in Fig. 1 and previously described. As the locking plate in this construction is inserted through the opening 26, it is necessary that this locking plate should have the shape hereinafter described to enable it to be inserted and turned into position, and so positioned to accomplish the functions desired. To this end the said locking plate, which is indicated generally by the numeral 46, has the contour shown in part by dotted and in part by full lines in Fig. 7, comprises an integral structure consisting of a head 47 rounded on its upper side as indicated at 48 and a tail-piece 49. The head 47 is of considerable width as shown in order to provide an extended lateral bearing surface and is of a thickness to fit snugly in the space between the inner side of the bearing block and support 17 and the inner face of an abutment 50 formed at the top of the opening 26. The forward side of the tail-piece 49 is beveled away as indicated at 51 in Fig. 5 to enable the locking plate 46 as a whole to be turned without the tail-piece striking the lugs 32, and the inner side of said tail-piece is straight or flat and is designed to engage the inner side of a projection 52 formed on the sill of the opening 26. The bottom of the tail-piece 49 is rounded as indicated at 53 in Fig. 7 and this, combined with the curvature 48 of the head 47 enables the locking plate as a whole to be suitably turned when inserted in the journal box and the lower end of the tail-piece brought to rest with the locking plate as a whole in a vertical position as shown in Fig. 7, in which movement the head 47 will roll upon the under side of the top 12 of the journal box. In order to secure the locking plate 46 from lateral movement the following locking means are provided:

Projecting from the rear side of the locking plate is a lug 54 which constitutes a ledge for supporting a transverse locking bar 55 which at its ends is adapted to bear against flanged abutments 56 extending outwardly from opposite sides of the journal box as shown particularly in Fig. 6. The locking bar 55 is provided with a central aperture through which passes a bolt 57 having a screw-threaded end to engage in a screw-threaded aperture in the rear face of the locking plate 46, as shown in Fig. 5, and provided with a squared head 58 which is adapted, when the bolt is turned home, to engage the rear side of the locking bar 55 and hold it firmly against the abutments 56 and at the same time draw the locking plate 46 firmly against the projections 50 and 52 of the journal box. This construction as will be seen will hold the locking plate in a fixed position against lateral movement. In order to prevent the said locking plate from turning on the bolt 57 as a pivot I provide a second locking bar 59 which is adapted to rest upon the sill 52 and be passed at its ends under lugs 60 projecting inward from either side of the journal box. At its forward side, the locking bar 59 is provided with a rectangular recess 61 which is adapted to embrace the rear side of the tail-piece 49 and at its rear side said locking bar is provided with a central recess 62. In order to prevent the bolt 57 from turning I provide a keeper 63, the upper end of which is provided with a head 64 having a squared opening 65 adapted to be inserted on the head 58 of said bolt, and its lower portion forming a tail-piece 66, the lower end of which is adapted to be received in the recess 62. It will be seen that the keeper 63 will thus be held from turning by engagement at its lower end in the recess 62 and in turn will prevent the bolt 57 from turning. The said keeper is prevented from moving off of the head 58 by the door 27 closing the opening 26, as previously referred to.

I claim:

1. In combination with a car axle box, an upper bearing block for the axle extending longitudinally thereof and adapted to bear upon the upper inner surface of the box, a lower relatively narrow support for the axle formed as a unitary part of said bearing block, and means for securing said combined bearing block and support in a relatively fixed position within the box.

2. In combination with a car axle box, an upper bearing block for the axle extending longitudinally thereof and adapted to bear upon the upper inner surface of the box, a lower relatively narrow support for the axle formed integral with said bearing block and engaging in one portion a fixed part of the box, a locking member insertible in the box and adapted to engage another portion of said bearing block and support for maintaining the latter in a relatively fixed position in the box, and means for securing said locking member in position in the box.

3. In combination with a car axle box, an upper bearing block and a lower support for the axle formed as an integral structure and adapted to engage in one portion a fixed part of the box, a shim insertible under the lower edge of said support, means for locking said shim in such position, a locking member insertible in the box and adapted to engage another portion of said bearing block and support, and means for securing said locking member in position in the box.

4. In combination with a car axle box, an upper bearing block and a lower support for the axle formed as an integral structure and adapted to engage in one portion a fixed part of the box, a locking member insertible through an opening formed in the top of said box and adapted to engage another portion of said bearing block and support, and means for securing said locking member in position in the box.

5. In combination with a car axle box, an upper bearing block and a lower support for the axle formed as an integral structure and adapted to engage in one portion a fixed part of the box, a shim provided at one end with an opening and insertible beneath the lower edge of said support, means in the box for engaging the other end of said shim to prevent lateral movement thereof, an apertured lug provided on the interior of the box, with the aperture of which the aperture in said shim is adapted to aline, a pin adapted to have its lower end passed through the apertures of said lug and shim, and to rest upon the bottom of said box, whereby to detachably secure the apertured end of said shim against movement, and means for securing said combined bearing block and support in a relatively fixed position in the box.

6. In combination with a car axle box having an oil hole in its top and provided on its interior beneath said oil hole with an apertured lug, a combined bearing block and support for the axle insertible in said box, a shim insertible beneath the lower edge of said support and having an apertured end located under the said apertured lug, means for securing the other end of said shim against movement, a pin insertible through said oil hole and adapted to pass through the apertures in said lug and shim and to rest upon the bottom of the box, whereby to lock the corresponding end of the shim against movement, and means for securing said bearing block and support in a relatively fixed position in the box.

7. In combination with a car axle box, an upper bearing block and a lower support for the axle formed as an integral structure and adapted to engage in one portion a fixed part of the box, a locking member insertible through an opening formed in the top of said box and adapted to engage another portion of said bearing block and support, means for securing said locking member at its lower end against movement, and means bearing against the upper end of said locking member when the journal box is secured in position on the car for preventing vertical movement of the locking member.

8. A bearing member for the axles of cars comprising a bearing block for engaging over the upper side of the axle and a support depending therefrom for engaging the under side of the axle, said bearing block and support having a common aperture for the axle and being formed as an integral structure.

9. A bearing member for the axles of cars comprising an elongated head constituting a bearing block for engaging over the upper portion of the axle, and a relatively narrow support depending centrally from said head for engaging under the lower portion of the axle, said bearing block and support having a common opening for the axle and being formed as an integral structure.

In testimony whereof, I have hereunto set my hand.

JOHN R. STEPHENS.